(12) United States Patent
McDaniel et al.

(10) Patent No.: US 12,719,245 B2
(45) Date of Patent: Aug. 25, 2026

(54) SECUREMENT DEVICE FOR USE WITH ELECTRICAL BOX

(71) Applicant: ERICO International Corporation, Solon, OH (US)

(72) Inventors: Steven McDaniel, Burton, OH (US); Bryson Allen, Naperville, IL (US); Raymond M. Olle, Valley View, OH (US); Jeffrey A Wilson, Cuyahoga Falls, OH (US)

(73) Assignee: ERICO International Corporation, Solon, OH (US)

( * ) Notice: Subject to any disclaimer, the term of this patent is extended or adjusted under 35 U.S.C. 154(b) by 316 days.

(21) Appl. No.: 18/636,722

(22) Filed: Apr. 16, 2024

(65) Prior Publication Data

US 2024/0348024 A1 Oct. 17, 2024

Related U.S. Application Data

(60) Provisional application No. 63/496,512, filed on Apr. 17, 2023.

(51) Int. Cl.
*H02G 3/00* (2006.01)
*H02G 3/04* (2006.01)

(52) U.S. Cl.
CPC ......... *H02G 3/0418* (2013.01); *H02G 3/0437* (2013.01); *H02G 3/263* (2013.01)

(58) Field of Classification Search
CPC ..... H02G 3/0418; H02G 3/0437; H02G 3/263
See application file for complete search history.

(56) References Cited

U.S. PATENT DOCUMENTS

| | | | |
|---|---|---|---|
| 855,924 | A | 6/1907 | Beaton |
| 1,168,889 | A | 1/1916 | Knauber |
| 1,559,273 | A | 10/1925 | Joseph et al. |
| 1,786,353 | A | 12/1930 | Logan |
| 1,805,027 | A | 5/1931 | Adell |
| 1,961,728 | A | 6/1934 | Arnest et al. |
| 2,661,677 | A | 12/1953 | Conrad |
| 3,082,987 | A | 3/1963 | Robinson |
| 3,131,901 | A | 5/1964 | Coleman |
| 3,597,889 | A | 8/1971 | Nigro |

(Continued)

FOREIGN PATENT DOCUMENTS

CA 2802928 C 11/2015

*Primary Examiner* — Sherman Ng
(74) *Attorney, Agent, or Firm* — Quarles & Brady LLP

(57) ABSTRACT

A securement device for an electrical wireway for use with an electrical box. The securement device can include an elongated body, a center hole located in a middle portion of the elongated body, a break feature extending on the middle portion of the elongated body, first-side holes located on a first side of the center hole, and second-side holes located on a second side of the center hole, opposite the first side. In some cases, the securement device can be installed in either of a first installed configuration or a second installed configuration. In the first installed configuration, the securement device can be installed unbroken along the break feature on the electrical box while, in the second installed configuration, the securement device can be broken along the break feature and either a first or second part of the securement device can be installed on the electrical box.

20 Claims, 9 Drawing Sheets

(56) References Cited

U.S. PATENT DOCUMENTS 4,149,693 A 4/1979 Lonigro
4,967,990 A * 11/1990 Rinderer ................ H02G 3/125 220/3.9
5,209,444 A 5/1993 Rinderer
5,354,952 A 10/1994 Hickey
5,386,959 A 2/1995 Laughlin et al.
5,405,111 A 4/1995 Medlin, Jr.
5,505,419 A 4/1996 Gabrius
5,619,263 A 4/1997 Laughlin et al.
5,698,820 A 12/1997 Collard
6,105,918 A 8/2000 Gromotka
6,461,016 B1 10/2002 Jamison et al.
6,484,979 B1 11/2002 Medlin, Jr.
6,484,980 B2 11/2002 Medlin
6,491,270 B1 * 12/2002 Pfaller ................... H02G 3/125 248/200.1
6,696,642 B1 2/2004 Corwin
6,761,341 B2 7/2004 Pfaller
6,768,071 B1 * 7/2004 Gretz ....................... H02G 3/20 248/200.1
6,870,100 B2 3/2005 Corwin
6,889,943 B2 * 5/2005 Dinh ..................... F04D 29/601 248/57
7,699,283 B2 4/2010 Vrame et al.
7,735,794 B1 6/2010 Gretz
7,874,539 B2 1/2011 Wright et al.
7,956,285 B2 6/2011 Tally et al.
8,047,491 B2 11/2011 Gutierrez
D649,863 S 12/2011 Meyer
8,091,721 B1 1/2012 Gretz
8,215,597 B1 7/2012 Medlin, Sr. et al.
8,297,579 B1 10/2012 Gretz
8,424,827 B2 4/2013 Dinh
9,010,696 B2 4/2015 Siddiqui et al.
9,435,353 B1 * 9/2016 Gretz .................... F04D 25/088
12,146,611 B1 * 11/2024 Gretz ..................... H02G 3/121
2008/0179481 A1 * 7/2008 Rubin de la Borbolla .................. H02G 3/125 248/200.1
2012/0298816 A1 * 11/2012 Siddiqui ................ H02G 3/105 248/220.21
2014/0150218 A1 * 6/2014 Colangelo ................ H02G 3/12 24/570
2017/0229852 A1 * 8/2017 Jones .................. F16M 13/022

* cited by examiner

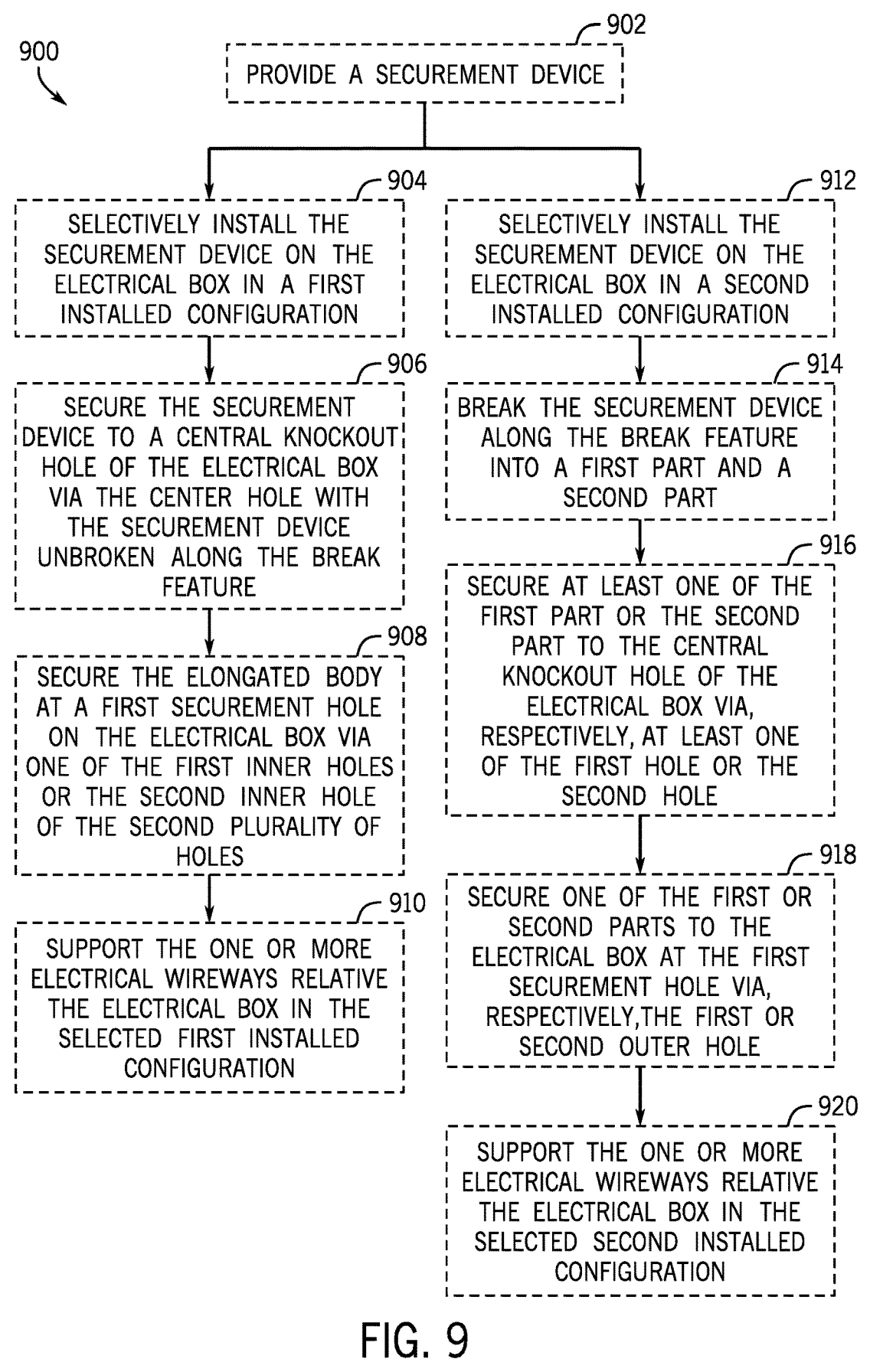

900

902 PROVIDE A SECUREMENT DEVICE

904 SELECTIVELY INSTALL THE SECUREMENT DEVICE ON THE ELECTRICAL BOX IN A FIRST INSTALLED CONFIGURATION

906 SECURE THE SECUREMENT DEVICE TO A CENTRAL KNOCKOUT HOLE OF THE ELECTRICAL BOX VIA THE CENTER HOLE WITH THE SECUREMENT DEVICE UNBROKEN ALONG THE BREAK FEATURE

908 SECURE THE ELONGATED BODY AT A FIRST SECUREMENT HOLE ON THE ELECTRICAL BOX VIA ONE OF THE FIRST INNER HOLES OR THE SECOND INNER HOLE OF THE SECOND PLURALITY OF HOLES

910 SUPPORT THE ONE OR MORE ELECTRICAL WIREWAYS RELATIVE THE ELECTRICAL BOX IN THE SELECTED FIRST INSTALLED CONFIGURATION

912 SELECTIVELY INSTALL THE SECUREMENT DEVICE ON THE ELECTRICAL BOX IN A SECOND INSTALLED CONFIGURATION

914 BREAK THE SECUREMENT DEVICE ALONG THE BREAK FEATURE INTO A FIRST PART AND A SECOND PART

916 SECURE AT LEAST ONE OF THE FIRST PART OR THE SECOND PART TO THE CENTRAL KNOCKOUT HOLE OF THE ELECTRICAL BOX VIA, RESPECTIVELY, AT LEAST ONE OF THE FIRST HOLE OR THE SECOND HOLE

918 SECURE ONE OF THE FIRST OR SECOND PARTS TO THE ELECTRICAL BOX AT THE FIRST SECUREMENT HOLE VIA, RESPECTIVELY,THE FIRST OR SECOND OUTER HOLE

920 SUPPORT THE ONE OR MORE ELECTRICAL WIREWAYS RELATIVE THE ELECTRICAL BOX IN THE SELECTED SECOND INSTALLED CONFIGURATION

FIG. 9

SECUREMENT DEVICE FOR USE WITH ELECTRICAL BOX

CROSS-REFERENCE TO RELATED APPLICATIONS

This application claims priority to and incorporates by reference U.S. provisional application No. 63/496,512, filed Apr. 17, 2023.

BACKGROUND

In many applications it may be useful to fixedly support raceways or wireways, including conduit, such as electric metallic tube (EMT) conduit, or cable, such as metal clad (MC) cable, relative to an electrical box into which those raceways enter. In some contexts, support of the raceways within a specified distance of the electrical box is required by code. There are various securement devices used to secure the raceway within a specified distance of the electrical box.

SUMMARY

The present disclosure relates, in general, to a securement device used to secure a raceway or a wireway within a specified distance of an electrical box.

Some embodiments of the invention provide a securement device for an electrical wireway for use with an electrical box. The securement device can include an elongated body; a first electrical wireway connector attached to a first side of the elongated body; and a second electrical wireway connector attached to a second side of the elongated body. The elongated body can include a center hole located in a middle portion of the elongated body, between the first and second sides, to secure the elongated body to the electrical box with the elongated body in an unbroken configuration; a break feature extending through the middle portion of the elongated body to define a break location on the elongated body to break the elongated body into a broken configuration that includes first and second parts of the elongated body; first-side holes located on the first side of the break feature to secure the first part of the elongated body to the electrical box with the elongated body in the broken configuration, the first-side holes including a first hole and a first plurality of holes; and second-side holes located on the second side of the break feature, opposite the first side, to secure the second part of the elongated body to the electrical box with the elongated body in the broken configuration, the second-side holes including a second hole and a second plurality of holes.

In some embodiments, the break feature can intersect the center hole and can include, without limitation, at least one of a score line, an area of weakened material, an area of removed material, or an area of thinner material.

In some cases, a diameter or an area of the center hole can be about the same as a diameter or an area of the first hole and can be about the same as a diameter or an area of the second hole.

In various instances, the center hole, the first-side holes, and the second-side holes can be aligned along an elongate direction of the elongated body.

In various embodiments, a first ratio of a diameter of the first hole to a diameter of at least one of the first plurality holes can be at least 2.5:1 and a second ratio of a diameter of the second hole to a diameter of at least one of the second plurality holes can be at least 2.5:1.

In some instances, the first hole can be a first distance away from a first inner hole of the first plurality of holes. The first distance can be measured between nearest edges of the first hole and the first inner hole, and greater than or equal to a thickness of the elongated body or can be measured between centers of the first hole and the first inner hole, and equal to about 0.25 inches.

In various cases, a first ratio, defined as a first distance between a center of the center hole and a center of the first hole over a second distance between the center of the first hole and a center of an inner hole of the first plurality of holes, is about 2:1.

In some embodiments, in the unbroken configuration, the center hole can be aligned to secure the elongated body at a central knockout hole of the electrical box. In the broken configuration, at least one of the first hole can be aligned to secure the first part at the central knockout hole of the electrical box or the second hole can be aligned to secure the second part at the central knockout hole of the electrical box. In some cases, the first hole can be closer to a first inner hole of the first plurality of holes than to the center hole and the second hole can be closer to a second inner hole of the second plurality of holes than to the center hole.

In various cases, in the unbroken configuration, at least one of an inner hole of the first plurality of holes can be aligned to secure the elongated body at a corresponding first securement hole on the electrical box or an inner hole of the second plurality of holes can be aligned to secure the elongated body at the corresponding first securement hole on the electrical box. In the broken configuration, at least one of an outer hole of the first plurality holes can be aligned to secure the first part at the corresponding first securement hole on the electrical box or an outer hole of the second plurality of holes can be aligned to secure the second part at the corresponding first securement hole on the electrical box. The inner hole of the first plurality of holes or the inner hole of the second plurality of holes can be an innermost hole and the outer hole of the first plurality holes or the outer hole of the second plurality holes can be an outermost hole.

In another aspect, a support arrangement for electrical devices can include an electrical box and a securement device that includes an elongated body. The elongated body can include a center hole located in a middle portion of the elongated body, between a first side of the elongated body that is configured to support a first wireway relative to the electrical box and a second side of the elongated body that is configured to support a second wireway relative to the electrical box, the center hole being arranged to secure the elongated body at a knockout of the electrical box and a break feature extending on the middle portion of the elongated body and intersecting the center hole, to allow the elongated body to be broken along the break feature for separate installation onto the electrical box of a first part of the elongated body and a second part of the elongated body.

In various embodiments, the break feature can include, without limitation, at least one of a score line, an area of weakened material, an area of removed material, or an area of thinner material, or the like.

In various cases, the securement arrangement can further include a first hole located on the first side of the elongated body and second hole located on the second side of the elongated body, on an opposite side of the center hole from the first hole. In a first installed configuration, with the elongated body unbroken along the break feature, the elongated body can be secured at a central knockout hole of the electrical box via the center hole. In a second installed configuration, with the elongated body broken along the break feature, at least one of the first part or the second part can be installed on the electrical box at the central knockout via at least one of the first hole or the second hole, respectively.

In some embodiments, the securement arrangement can further include a first plurality of holes located on the first side of the elongated body, to an opposite side of the first hole from the center hole, including a first inner hole and a first outer hole and a second plurality of holes located on the second side of the elongated body, to an opposite side of the second hole from the center hole, including a second inner hole and a second outer hole. In a first installed configuration, with the elongated body unbroken along the break feature, the elongated body can further be secured at a first securement hole on the electrical box via one of the first inner hole or the second inner hole. In a second installed configuration, with the elongated body broken along the break feature, one of the first or second parts is further secured to the electrical box at the first securement hole via, respectively, the first or second outer hole.

In another aspect, a method of installing one or more electrical wireways on an electrical box can include providing a securement device. The securement device can include an elongated body; a center hole located in a middle portion of the elongated body; a break feature extending on the middle portion of the elongated body; first-side holes located on a first side of the center hole, including a first hole and a first plurality of holes opposite the first hole from the center hole; and second-side holes located on a second side of the center hole, opposite the first side, including a second hole and a second plurality of holes opposite the second hole from the center hole. Next, the method can include selectively installing the securement device on the electrical box in either of a first installed configuration or a second installed configuration, by for the first installed configuration, with the securement device unbroken along the break feature, securing the securement device to a central knockout hole of the electrical box via the center hole and for the second installed configuration, by breaking the securement device along the break feature into a first part and a second part and securing at least one of the first part or the second part to the central knockout hole of the electrical box via, respectively, at least one of the first hole or the second hole. In some cases, the method can further include supporting the one or more electrical wireways relative the electrical box in the selected first or second installed configuration via the elongated body, in the first installed configuration and the at least one of the first part or the second part, in the second installed configuration.

In some cases, the first plurality of holes includes a first inner hole and a first outer hole and the second plurality of holes includes a second inner hole and a second outer hole. In some cases, in the first installed configuration, the method further comprises securing the elongated body at a first securement hole on the electrical box via one of the first inner hole or the second inner hole and in the second installed configuration, the method further comprises securing one of the first or second parts to the electrical box at the first securement hole via, respectively, the first or second outer hole. The first or second inner hole can be an innermost hole and the first or second outer hole can be an outermost hole.

In various instances, installing the securement device on the electrical box in the second installed configuration further includes providing a second securement device that includes a second elongated body and a second center hole located in a middle portion of the second elongated body and providing a second securement device that includes a second elongated body and a second center hole located in a middle portion of the second elongated body.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIG. 9 is a method for using a securement device of FIGS. 1-8; and

DETAILED DESCRIPTION

Figures 1, 2:
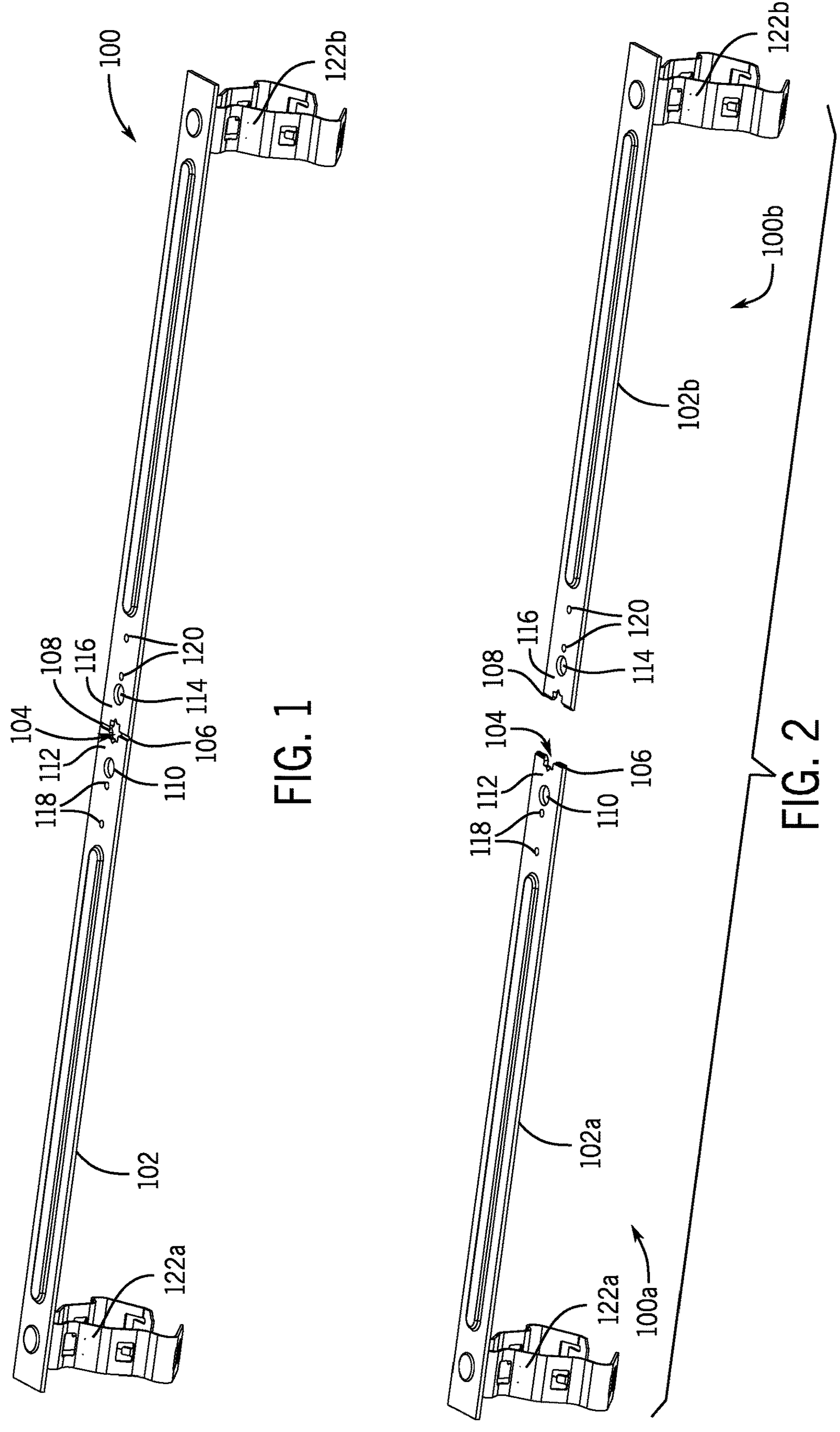
FIG. 1 is a top front isometric view of a securement device according to an embodiment of the invention.
FIG. 2 is a top front isometric view of the securement device of FIG. 1 broken along a break feature.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of “including,” “comprising,” or “having” and variations thereof herein is meant to encompass the items listed thereafter and equivalents thereof as well as additional items. Unless specified or limited otherwise, the terms “mounted,” “connected,” “supported,” “attached,’ and “coupled” and variations thereof are used broadly and encompass both direct and indirect mountings, connections, supports, and couplings. Further, “connected” and “coupled” are not restricted to physical or mechanical connections or couplings.

As used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations. Additionally, unless otherwise specified or limited, the terms “about” and “approximately,” as used herein with respect to a reference value or ratio, refer to variations from the reference value or ratio of ±20% or less (e.g., ±15, ±10%, ±5%, etc.), inclusive of the endpoints of the range.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Some of the discussion below describes a securement device that can be used to support a conduit or a cable relative to an electrical box. The context and particulars of this discussion are presented as examples only. For example, embodiments of the disclosed invention can be configured in various ways, including with other shapes and arrangements of elements than are expressly described or illustrated. Similarly, embodiments of the invention can be used with arrangements of electrical boxes, supports for electrical boxes, or other assemblies other than those expressly illustrated or described herein.

Ceiling-hung installation of a raceway or wireway (e.g., conduit or cable) requires a first means of securement within a certain distance from an electrical box that the wireway is attached to (e.g., twelve inches for metal-clad (MC) cable and three feet for rigid conduit or Electrical Metallic Tubing (EMT)). Securing a raceway or wireway near an electrical box can be achieved through various methods, including bending the conduit with a pipe bender to be adjacent a framing member and securing the conduit to the framing member, bending the cable to a framing member and securing the cable to the framing member with a clamp, or installing a type of channel between the framing members and securing the conduit or cable to the channel with clamps. Although these conventional arrangements can provide adequate and code compliant securement of a wireway when the electrical box is located proximate the framing member or channel, in some installation scenarios, the electrical box can be located a distance farther from the framing member or channel that does not allow for a securement of the wireway within a code compliant distance from the electrical box (e.g., when the electrical box is attached to a threaded rod hanging from a ceiling structural member and spaced away from any other structural member). This type of installation would require the wireway to be supported by a clamp attached to a threaded rod hanging from the ceiling structural member at a code compliant distance from the electrical box. Such securement installation requirements can provide adequate support, but labor can be fairly intensive for such an arrangement. Additionally, such arrangements can have limitations especially when installed near corners or walls of a building.

Embodiments of the invention can address these or other issues. For example, in some embodiments, a securement device according to the invention can provide a relatively simple arrangement that can secure individual or multiple wireways (e.g., serving as a first means of securement for a wireway within a code-required distance of an electrical box) near corners or walls of a building with minimal labor requirements. In some embodiments, securement devices according to the invention can be readily installed by hand, with limited use of tools. For example, a break location can be defined along the elongated body by providing a break feature extending through a middle portion of the elongated body of the securement device. In particular, a break location can provide a location at which the elongated body can be broken in-field or otherwise with manual force, and can correspondingly allow the elongated body to be selectively broken into a pre-defined separated configuration (e.g., with pre-defined shortened lengths) via yielding of the material of the elongated body at the break location. In this regard, for example, the securement device can easily be broken along the break line to form a securement device of a different size for installation near corners and walls of a building.

Figures 3, 4:
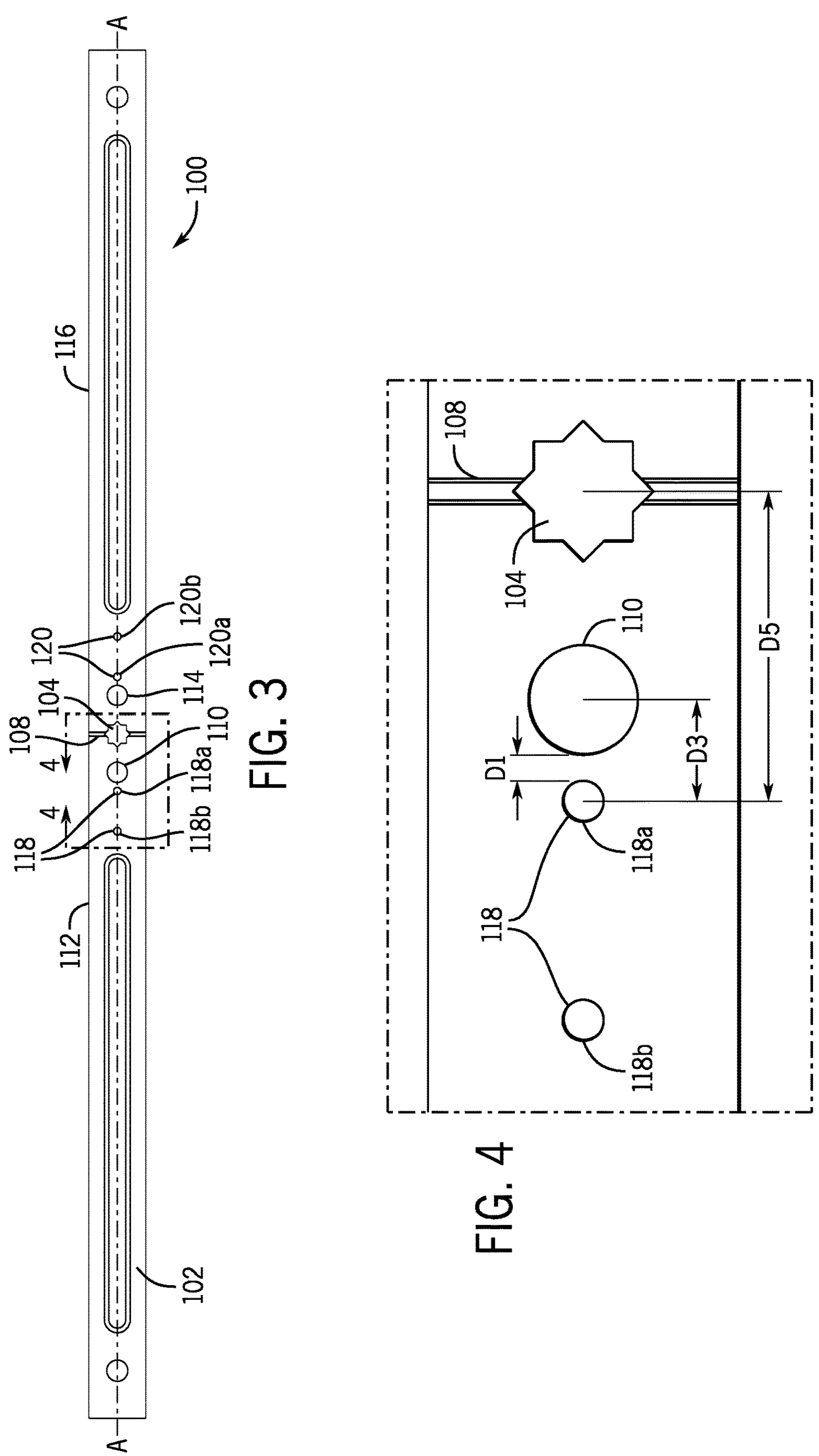
FIG. 3 is a top view of the securement device of FIG. 1.
FIG. 4 is a zoomed in portion of the securement device of FIG. 3.

FIGS. 1 through 3 illustrate a securement device 100 according to an embodiment of the present invention. The securement device 100 includes an elongated body 102 with a corresponding elongate direction (i.e., left-to-right in FIG. 3, for the example shown). The elongated body 102 further includes a center hole 104 in a middle portion 106 of the elongated body 102, a break feature 108 extending the through the center hole 104, first-side holes comprising a first hole 110 located on a first side 112 of the center hole 104 and a first plurality of holes located on the first side 112 of the center hole 104, and second-side holes including a second hole 114 located on a second side 116 of the center hole 104 opposite the first hole 110 and a second plurality of holes located on the second side 116. The elongated body 102 might further include one or more electrical wireway connectors 122*a* and 122*b* to secure or hold a wireway (not shown) a code compliant distance from the electrical box. The connectors 122*a* and 122*b* can include, without limitation, clamps, clasps, hooks, fasteners, or other connector configured to secure or hold a cable, a wireway (e.g., metal or other conduit), or the like, according to any variety of configurations known in the art.

In various cases, although the center hole 104 is described as a "center" hole, the center hole 104 should not be limited to only being in a center of the elongated body 102. The center hole 104 can be located in a center of the elongated body 102, in about a center of the elongated body 102, in a middle portion of the elongated body 102, between two or more holes (e.g., a first hole 110 and a second hole 114 or the like), or the like.

In some embodiments, the break feature 108 extends along (e.g., through) a middle portion 106 of the elongated body 102. The middle portion 106 of the elongated body 102 can include the center hole 104 and areas of the elongated body 102 near, surrounding, or on sides of the center hole 104. In some instances, the break feature 108 intersects the center hole 104 (e.g., extends to meet a virtual centerline or other center portion thereof to bisect or otherwise divide the center hole 104 relative to the elongate direction of the elongated body 102). Thus, when the elongated body 102 is broken along the break feature 108, the elongated body 102 can be broken in half, resulting in two parts of the elongated body 102 that can provide two different securement devices 100*a* and 100*b* (e.g., formed in particular as elongated part bodies 102*a* and 102*b* with pre-defined lengths as shown in FIG. 2). Alternatively, in different embodiments, the break feature 108 can be off center of the center hole 104 or can extend through the elongated body 102 at a different location other than the center hole 104. In other words, the break feature 108 may be placed at different locations of the elongated body 102 to break the elongated body 102 into different lengths. The break feature 108 can be at least one of a continuous or dashed score line on the elongated body 102, an area of weakened material on the elongated body 102, a continuous or discontinuous (e.g., dashed line) arrangement of perforations or other holes, an area of thinner material on the elongated body 102, an area of removed material, or the like.

In some examples, a break feature may allow a securement device to be breakable with manual force of less than a particular threshold or with application of force of a particular percentage of the rated strength of the securement device. For example, some break features (e.g., continuous or other score lines, cut-outs, or other areas of thinned or removed material) can be sized, located, or otherwise configured to allow an elongate body of a securement device to be breakable with manual force applied at a predetermined force threshold toward or at opposing ends of the elongate body. In some cases, some break features provide a location to work harden the material of the securement device by hand force. One or more bends of the securement device work hardens the break feature past 100% of the elongation strength of the material of the securement device thus fracturing the securement device into two parts or two halves.

In various cases, the center hole 104, the first hole 110, and the second hole 114 may be the same size or about the same size (e.g., the holes 104, 110, 114 may have about the same diameters, or about the same (projected) areas). Alternatively, the center hole 104, the first hole 110, and the second hole 114 may be different sizes. In some cases, the center hole 104, the first hole 110, the second hole 114, the first plurality of holes 118, and the second plurality of holes 120 are aligned along an axis A-A (shown in FIG. 3) extending through a center of the elongated body 102. In various cases, the axis A-A can further extend through a center of each of the center hole 104, the first hole 110, the second hole 114, the first plurality of holes 118, and the second plurality of holes 120.

In some embodiments, instead of the first plurality of holes 118 and the second plurality of holes 120, there may be only one hole 118 and one hole 120 on the elongated body 102. In some cases, the first plurality of holes 118 and the second plurality of holes 120 are smaller than the center hole 104, the first hole 110, or the second hole 114. Additionally, the first hole 110 can be located between the center hole 104 and the first plurality of holes 118 on the first side 112 of the center hole 104 and the second hole 114 can be located between the center hole 104 and the second plurality of holes 120 on the second side 116 of the center hole 104. As shown in FIGS. 3 and 4 in particular, the first hole 110 is located closer to an inner hole 118*a* of the first plurality of holes 118 than to the center hole 104 and the second hole 114 is located closer to an inner hole 120*a* of the second plurality of holes 120 than the center hole 104. As also detailed below, this can be useful because the securement device 100 can then be adapted to secure to the electrical box in different arrangements (e.g., unbroken and broken states) and at different lengths. For example, by having the first hole 110 located closer to the center hole 104, in the unbroken state, an inner hole 118*a* of the first plurality of holes can be configured to align and secure to a first securement hole of the electrical box while, in the second broken state, an outer hole 118*b* of the first plurality of holes 118 can be configured to align and secure to the first securement hole of the electrical box. This is discussed in more detail below with respect to FIGS. 5-8.

In some cases, the center hole 104, the first hole 110, the second hole 114, the first plurality of holes 118, and the second plurality of holes 120 may be circular shaped, star shaped, oval shaped, triangular shaped, square shaped, rectangular shaped, or the like. The center hole 104, the first hole 110, the second hole 114, the first plurality of holes 118, and the second plurality of holes 120 may be configured to receive one or more screws, nails, bolts, threaded rods, other fasteners. or the like. In some instances, the center hole 104, the first hole 110, or the second hole 114 are configured to receive a threaded rod while the first plurality of holes 118 or the second plurality of holes 120 are configured to receive one or more screws. The center hole 104, the first hole 110, the second hole 114, the first plurality of holes 118, and the second plurality of holes 120 may be sized such that a threaded rod or a screw will cut its own threads into the center hole 104, the first hole 110, the second hole 114, the first plurality of holes 118, and the second plurality of holes 120.

Continuing with the illustrated embodiment shown in FIGS. 1 through 3, a first ratio of a diameter or area of the first hole 110 to a diameter or area of at least one of the first plurality of holes 118 is about 2.5:1 and a second ratio of a diameter or area of the second hole 114 to a diameter or area of at least one of the second plurality of holes 120 is about 2.5:1. In other examples, however, other relative sizes are possible.

In some cases, as shown in FIG. 4, an edge of the first hole 110 is a first distance D1 away from an edge of an inner hole 118*a* of the first plurality of holes 118. Similarly, an edge of the second hole 114 can be a second distance (not shown) away from an edge of an inner hole 120*a* of the second plurality of holes 120. The first distance D1 and the second distance may be greater than or equal to a thickness (e.g., about 0.05 inches or more) of the elongated body 102. In other examples, however, other distances are possible.

In various instances, a center of the first hole 110 is a third distance D3 away from a center of an inner hole 118*a* of the first plurality of holes 118 and a center of the second hole 114 is a fourth distance (not shown) away from a center of an inner hole 120*a* of the second plurality of holes 120. The third distance D3 and the fourth distance may be equal to about 0.25 inches. In other examples, however, other distances are possible.

In some embodiments, a first ratio of a fifth distance D5 between a center of the center hole 104 and a center of the first hole 110 to a third distance D3 between the center of the first hole 110 and a center of an inner hole 118*a* of the first plurality of holes 118 is about 2:1 and a second ratio of a sixth distance (not shown) between the center of the center hole 104 and a center of the second hole 114 to a fourth distance (not shown) between the center of the second hole 114 and a center of an inner hole 120*a* of the second plurality of holes 120 is about 2:1. In other examples, however, other relative sizes are possible.

Figure 5:
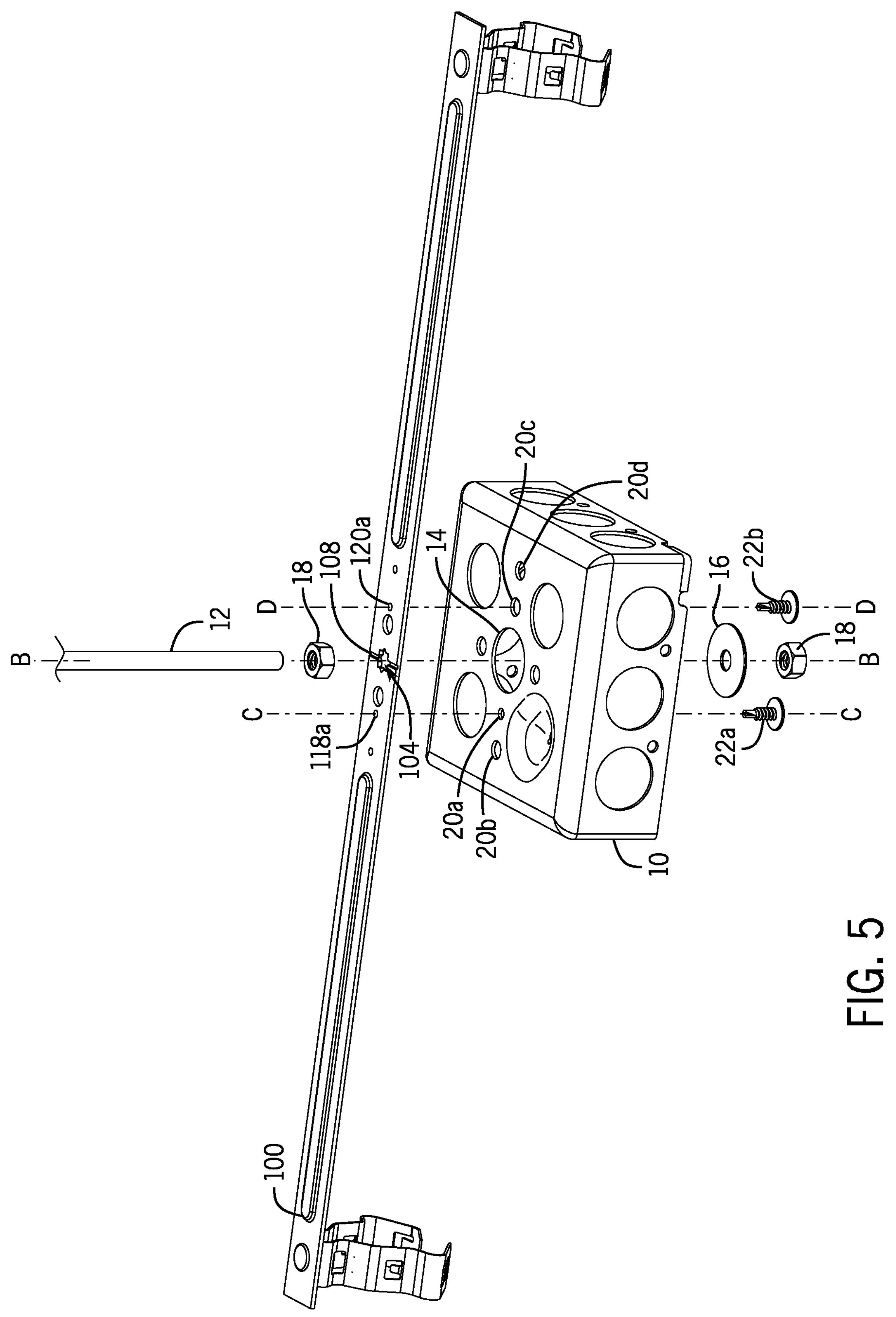
FIG. 5 is a top front isometric view of the securement device of FIG. 1 being installed on an electrical box in an unbroken state.
Figure 6:
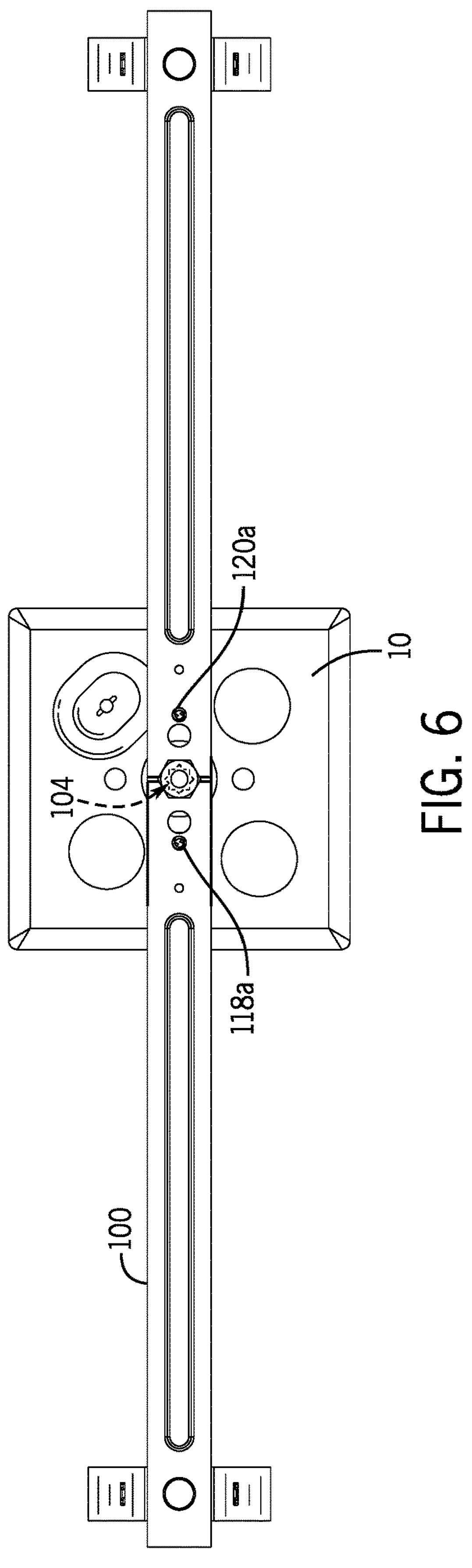
FIG. 6 is a top view of the securement device of FIG. 1 installed on an electrical box in an unbroken state.

Turning to FIG. 5, the securement device 100 is shown being installed on an electrical box 10 in an unbroken (first) configuration and, in FIG. 6, the securement device 100 is shown installed on an electrical box 10 in the unbroken (second) configuration. Generally, an unbroken configuration refers to the state in which the securement device 100 or elongated body 102 remains as a single body that has not been broken along the break feature 108. As further discussed below, the unbroken securement device 100 can provide a first means of securement for one or more wireways (not shown) extending in opposing directions from the electrical box 10.

As shown in FIG. 5, the electrical box 10 might be a square electrical box, although other configurations are possible (e.g., hexagonal, circular, or the like). A threaded rod 12 is configured to extend through the center hole 104 of the securement device 100 and a central knockout (or other) hole 14 of the electrical box 10 as shown by dashed line B-B. The threaded rod 12 might be configured to hang from a ceiling of a building, one or more framing members of a building, one or more structural members of a ceiling, or the like. The electrical box 10 is attached to the threaded rod 12 through the center hole 104 of the securement device and the central hole 14 of the electrical box 10 via one or more washers 16 or nuts 18.

The securement device 100 is further configured to attach to one or more securement holes 20*a*-20*d* located on the electrical box 10 using the plurality of holes 118 and 120. In a non-limiting example, the inner hole 118*a* of the first plurality of holes 118 is configured to align with inner securement hole 20*a* of the electrical box as shown by dashed line C-C and the inner hole 120*a* of the second plurality of holes 120 is configured to align with the inner securement hole 20*c* of the electrical box 10 as shown by dashed line D-D. The securement device 100 may be connected to electrical box 10 via a screw 22*a* extending through inner hole 118*a* and inner securement hole 20*a*. The securement device 100 may further be connected to electrical box 10 via a screw 22*b* extending through inner hole 120*a* and inner securement hole 20*c*.

Figure 7:
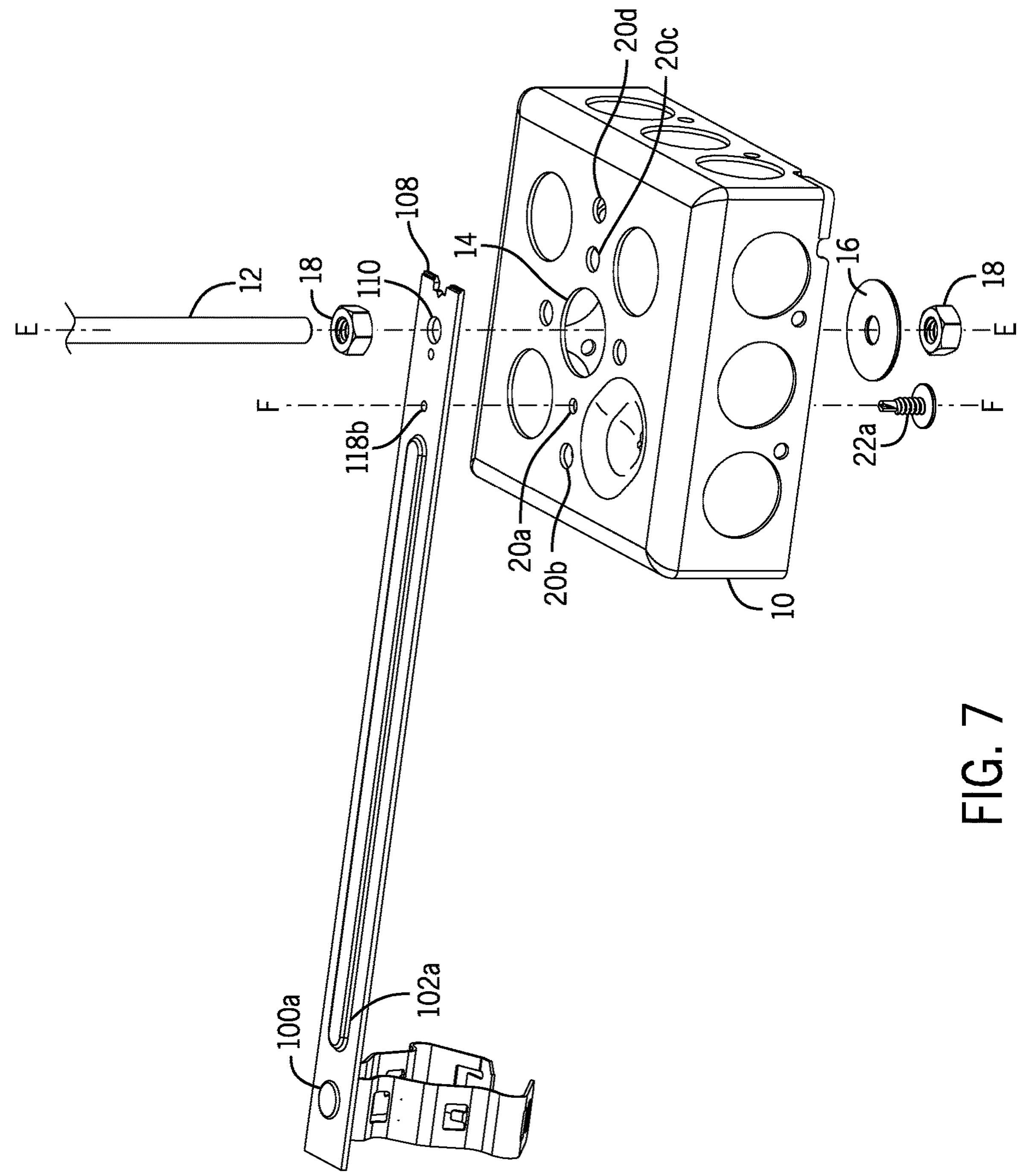
FIG. 7 is a top front isometric view of the securement device of FIG. 2 being installed on an electrical box in a broken state.
Figure 8:
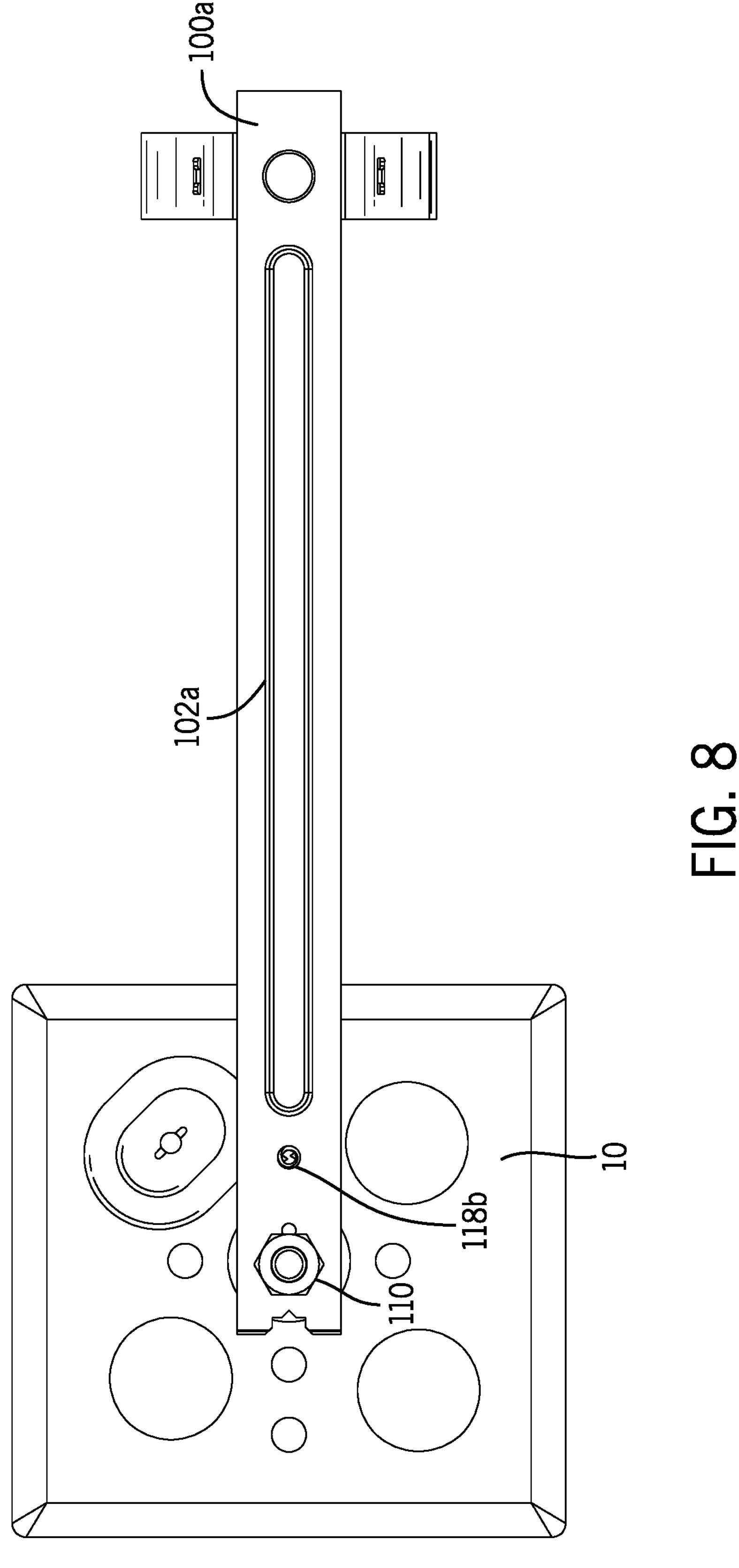
FIG. 8 is a top view of the securement device of FIG. 2 installed on an electrical box in a broken state.

Turning to FIG. 7, the securement device 100*a* is shown being installed on an electrical box 10 in a broken (second) configuration and, in FIG. 8, the securement device 100*a* is shown installed on an electrical box 10 in the broken configuration. Generally, a broken configuration refers to the state in which the securement device 100 or elongated body 102 has been broken along the break feature 108 into securement devices 100*a* and 100*b* (or elongated part bodies 102*a* and 102*b*, as shown in FIG. 2). As further discussed below, the securement device 100*a* (or 100*b*) can provide a first means of securement for one or more wireways (not shown) extending from the electrical box 10 in a corresponding single direction.

FIGS. 7 and 8 will be described with respect to securement device 100*a* of FIG. 2. However, a person of ordinary skill in the art would understand that securement device 100*b* of FIG. 2 may be used in a similar manner as securement device 100*a*. As shown in FIG. 7, a threaded rod 12 is configured to extend through the first hole 110 of the securement device 100*a* and a central hole 14 of the electrical box 10 as shown by dashed line E-E. The electrical box 10 is attached to the threaded rod 12 through the center hole 104 of the securement device and the central hole 14 of the electrical box 10 via one or more washers 16 or nuts 18.

The securement device 100*a* is further configured to attach to one or more securement holes 20*a*-20*d* located on the electrical box 10 using the first plurality of holes 118. In a non-limiting example, the outer hole 118*b* of the first plurality of holes 118 is configured to align with inner securement hole 20*a* of the electrical box 10 as shown by dashed line F-F. The securement device 100*a* may be connected to electrical box 10 via a screw 22*a* extending through outer hole 118*b* and inner securement hole 20*a*.

Thus, as illustrated in FIGS. 5 through 8, when the securement device 100 is in a first unbroken configuration and installed on the electrical box, (1) the center hole 104 is configured to align with a central hole 14 of the electrical box 10 and (2) an inner hole 118*a* of the first plurality of holes 118 or an inner hole 120*a* of the second plurality of holes 120 is configured to align with a corresponding inner securement hole 20*a* or 20*c* on the electrical box 10. However, when the securement device 100*a* is in a second broken configuration or state and installed on the electrical box 10, (1) the first hole 110 is configured to align with the central hole 14 of the electrical box 10 and (2) the outer hole 118*b* of the first plurality of holes 118 is configured to align with the corresponding inner securement hole 20*a* on the electrical box 10. In some embodiments, the inner holes 118*a* and 120*a* might be an innermost hole (e.g., an inner hole that is closest to the first hole 110 or the second hole 114 without any other holes 118 or 120 in between) while the outer holes 118*b* and 120*b* might be an outermost hole (e.g., an outer hole where there are no other holes of the plurality of holes 118 and 120 on a side opposite a side with the inner holes 118*a* and 120*a*).

There are several advantages that can be obtained by being able to couple the securement device 100 in two configurations (e.g., a first unbroken configuration and a second broken configuration) to the electrical box 10. For example, the securement device 100 can be installed in different configurations depending on the needs of a particular application. In a non-limiting example, when the electrical box is installed in a ceiling away from walls or corners, the securement device 100 can be installed in the first unbroken configuration to allow wire to extend in at least two opposite directions from the electrical box 10. Alternatively, when the electrical box 10 is installed near a corner or wall of a building, the securement device 100 can be installed in the second broken configuration to allow wire to extend from the electrical box 10 in at least one direction away from the corner or wall.

Additionally, by aligning different holes of the securement device 100 in the first unbroken state or the second unbroken state with the holes of the electrical box 10, the securement device 100 can be advantageously coupled to the electrical in different configurations. In a non-limiting example, by having the center hole 104, the first hole 110, or the second hole 114 be configured to align with the central hole 14 of the electrical box 10, the securement device 100 can be configured or sized to best fit a particular application. Further, by having the inner hole 118*a* or 120*a* be configured to align with the corresponding inner securement hole 20*a* or 20*c* of the electrical box 10 in the first unbroken configuration and by having the outer hole 118*b* or 120*b* be configured to align with the corresponding inner securement hole 20*a* or 20*c* of the electrical box 10 in the second broken configuration, the securement device 100 can be securely coupled to the electrical box 10 in both the first unbroken state and the second broken state at at least two locations (e.g., the center hole 104, the first hole 110, or the second hole 114 and the inner hole 118*a* or 120*a* or the outer hole 118*b* or 120*b*). By ensuring that there are at least two points of coupling between the securement device 100 and the electrical box 10, shifting or displacement between the securement device 100 and the electrical box 10 can be reduced or prevented.

In some examples, a method 900 might be used to selectively install the securement devices 100 of FIGS. 1-8. The method may, at block (e.g., manual operation) 902, include providing a securement device of FIGS. 1-8. The method might further include, at block 904, selectively installing the securement device on the electrical box in a first installed configuration. Alternatively, the method may continue onto operation 912, including selectively installing the securement device on the electrical box in a second installed configuration. In other words, in some examples, installers can selectively decide whether to install a particular securement device in an unbroken (first) configuration or an unbroken (second) configuration, depending on the needs of the particular application. In a non-limiting example, if the electrical box is located away from a wall or a corner, the securement device may be installed in the first unbroken configuration. Alternatively, if the electrical box is located near a wall of a corner, the securement device may be installed in the second broken configuration.

When the method 900 includes selectively installing the securement device in the first installed configuration, the method 900 might continue onto block 906, and include securing the securement device to a central knockout hole of the electrical box via the center hole with the securement device unbroken along the break feature. The securement device may be attached to the electrical box via the center hole and the central knockout hole using one or more threaded rods, screws, nails, or the like. Next, at block 908, the method 900 might include securing the elongated body at a first securement hole on the electrical box via one of a first inner hole of the first plurality of holes or a second inner hole of the second plurality of holes. The securement device may be attached to the electrical box via the inner hole of the first plurality of holes or the inner hole of the second plurality of holes and the corresponding first securement hole using one or more threaded rods, screws, nails, or the like. The method 900, at block 910, can include supporting the one or more electrical wireways relative the electrical box in the selected first installed configuration. The electrical wireways can be supported by the elongated body in the first configuration and one or more wireway connectors.

When the method 900 includes selectively installing the securement device in the second installed configuration, the method 900 might continue onto block 914 to include breaking the securement device along the break feature into a first part and a second part. The method 900, at block 916 can further include securing at least one of the first part or the second part to the central knockout hole of the electrical box via, respectively, at least one of the first hole or the second hole. The securement device may be attached to the electrical box via the first hole or the second hole and the central knockout hole using one or more threaded rods, screws, nails, or the like. Next, at block 918, the method 900 might include securing one of the first or second parts to the electrical box at the first securement hole via, respectively, the first or second outer hole. The securement device may be attached to the electrical box via the outer hole of the first plurality of holes or the outer hole of the second plurality of holes and the corresponding first securement hole using one or more threaded rods, screws, nails, or the like. The method 900, at block 920, can include supporting the one or more electrical wireways relative the electrical box in the selected second installed configuration. The electrical wireways can be supported by at least one of the first part or the second part and at least one of the wireway connectors.

Figure 10A:
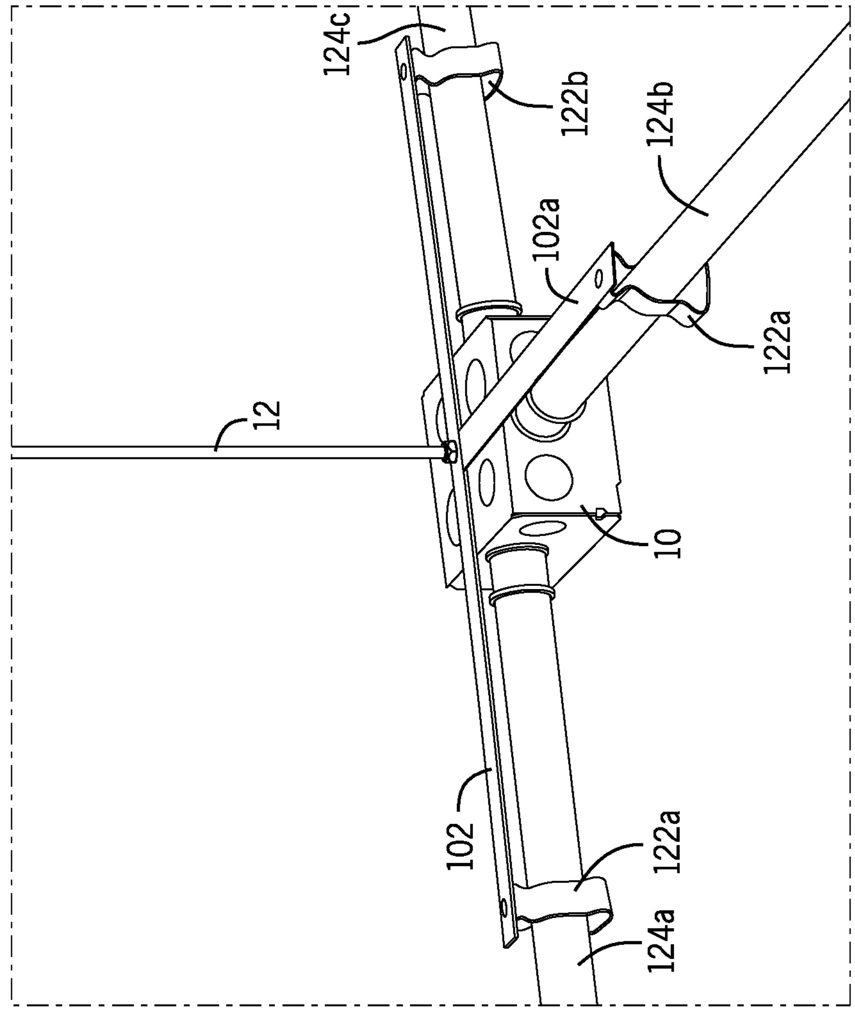
FIGS. 10A and 10B illustrate example arrangements of securement devices, according to an embodiment of the invention.
Figure 10B:
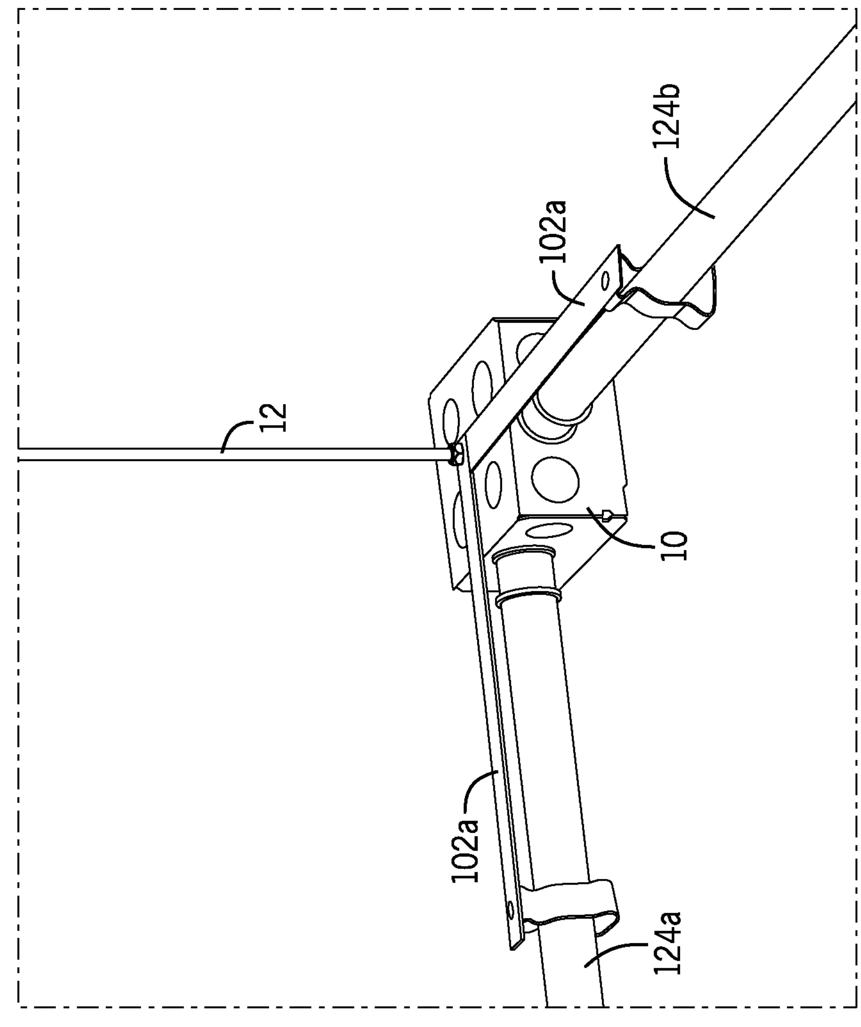

The method of FIG. 9 can be applied to multiple securement devices or parts thereof as shown in FIGS. 10A and 10B. FIGS. 10A and 10B illustrate example arrangements of securement devices, according to embodiments of the invention. In FIG. 10A, a first securement device in the unbroken configuration and with an elongated body 102 can be installed with a second securement device in the broken configuration with an elongated part body 102*a*. In various cases, the elongated part body 102*a* of the second securement device could be installed under or over the elongated body 102 of the first securement device. However, installing the elongated part body 102*a* of the second securement device under the elongated body 102 of the first securement device can provide a more stable attachment between the electrical box and the second securement device. In various cases, both the elongate body 102 of the first securement device and the elongated part body 102*a* of the second securement device are installed on a common or same threaded rod 12 that suspends the electrical box 10. By installing an elongated body 102 and an elongated part body 102*a* on the electrical box 10, the electrical box 10 can be adapted to fit along a wall of a building or ceiling. The elongated body 102 and an elongated part body 102*a* can be used to support three wireways (e.g., wireways 124*a*-124*c*).

In FIG. 10B, an elongated part body 102*a* of a first securement device in the broken configuration can be installed with an elongated part body 102*b* of the first securement device or another securement device in the broken configuration on the electrical box 10. In various cases, the elongated part body 102*a* of the first securement device could be installed under or over the elongated part body 102*b* of the first securement device or another securement device. In various cases, both the elongate part body 102*a* of the first securement device and the elongated part body 102*b* of the first securement device or another device are installed on a common or same threaded rod 12 that suspends the electrical box 10. By installing two elongated part bodies 102*a* and 102*b* on the electrical box 10, the electrical box 10 can be adapted to fit within a corner of a building or ceiling. The elongated part body 102*a* and the elongated part body 102*b* can be used to support two wireways (e.g., wireways 124*a* and 124*b*).

Thus, embodiments of the inventions provide improved securement of electric wireways (e.g., conduit or cables to a support structure such as, for example, an electrical box). In some embodiments, securement devices according to the invention can substantially reduce the time and labor that may be required during installation and use, such as by configuring the securement devices to be broken along a break feature to obtain two different securement devices. Further, configurations of the securement device broken along the break feature allow electrical boxes to be installed near corners or walls of a building.

In some implementations, devices or systems disclosed herein can be utilized or installed using methods embodying aspects of the invention. Correspondingly, description herein of particular features or capabilities of a device or system is generally intended to inherently include disclosure of a method of using such features for intended purposes and of implementing such capabilities. Similarly, express discussion of any method of using a particular device or system, unless otherwise indicated or limited, is intended to inherently include disclosure, as embodiments of the invention, of the utilized features and implemented capabilities of such device or system.

As used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "only one of," or "exactly one of." For example, a list of "only one of A, B, or C" indicates options of: A, but not B and C; B, but not A and C; and C, but not A and B. In contrast, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A;

one or more B; one or more C; one or more A and one or more B; one or more B and one or more C; one or more A and one or more C; and one or more A, one or more B, and one or more C. Similarly, a list preceded by "a plurality of" (and variations thereon) and including "or" to separate listed elements indicates options of one or more of each of multiple of the listed elements. For example, the phrases "a plurality of A, B, or C" and "two or more of A, B, or C" indicate options of: one or more A and one or more B; one or more B and one or more C; one or more A and one or more C; and one or more A, one or more B, and one or more C.

Also unless otherwise specifically indicated, ordinal numbers are used herein for convenience of reference, based generally on the order in which particular components are presented in the relevant part of the disclosure. In this regard, for example, designations such as "first," "second," etc., generally indicate only the order in which a thus-labeled component is introduced for discussion and generally do not indicate or require a particular spatial, functional, temporal, or structural primacy or order.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

We claim:

1. A securement device for an electrical wireway for use with an electrical box, the securement device comprising:

an elongated body;

a first electrical wireway connector attached to a first side of the elongated body; and a second electrical wireway connector attached to a second side of the elongated body;

the elongated body including:

a center hole located in a middle portion of the elongated body, between the first and second sides, to secure the elongated body to the electrical box with the elongated body in an unbroken configuration;

a break feature extending through the middle portion of the elongated body to define a break location on the elongated body to break the elongated body into a broken configuration that includes first and second parts of the elongated body;

first-side holes located on the first side of the break feature to secure the first part of the elongated body to the electrical box with the elongated body in the broken configuration, the first-side holes including a first hole and a first plurality of holes; and second-side holes located on the second side of the break feature, opposite the first side, to secure the second part of the elongated body to the electrical box with the elongated body in the broken configuration, the second-side holes including a second hole and a second plurality of holes.

2. The securement device of claim 1, wherein the break feature intersects the center hole.

3. The securement device of claim 1, wherein the break feature is at least one of a score line, an area of weakened material, an area of removed material, or an area of thinner material.

4. The securement device of claim 1, wherein a diameter or an area of the center hole is about the same as a diameter or an area of the first hole and is about the same as a diameter or an area of the second hole.

5. The securement device of claim 1, wherein the center hole, the first-side holes, and the second-side holes are aligned along an elongate direction of the elongated body.

6. The securement device of claim 1, wherein a first ratio of a diameter of the first hole to a diameter of at least one of the first plurality holes is at least 2.5:1 and a second ratio of a diameter of the second hole to a diameter of at least one of the second plurality holes is at least 2.5:1.

7. The securement device of claim 1, wherein the first hole is a first distance away from a first inner hole of the first plurality of holes; and wherein the first distance is:

measured between nearest edges of the first hole and the first inner hole, and greater than or equal to a thickness of the elongated body; or measured between centers of the first hole and the first inner hole, and equal to about 0.25 inches.

8. The securement device of claim 1, wherein a first ratio, defined as a first distance between a center of the center hole and a center of the first hole over a second distance between the center of the first hole and a center of an inner hole of the first plurality of holes, is about 2:1.

9. The securement device of claim 1, wherein, in the unbroken configuration, the center hole is aligned to secure the elongated body at a central knockout hole of the electrical box; and wherein, in the broken configuration, at least one of:

the first hole is aligned to secure the first part at the central knockout hole of the electrical box; or the second hole is aligned to secure the second part at the central knockout hole of the electrical box.

10. The securement device of claim 9, wherein the first hole is closer to a first inner hole of the first plurality of holes than to the center hole and wherein the second hole is closer to a second inner hole of the second plurality of holes than to the center hole.

11. The securement device of claim 10, wherein, in the unbroken configuration, at least one of:

an inner hole of the first plurality of holes is aligned to secure the elongated body at a corresponding first securement hole on the electrical box; or an inner hole of the second plurality of holes is aligned to secure the elongated body at the corresponding first securement hole on the electrical box;

wherein, in the broken configuration, at least one of:

an outer hole of the first plurality holes is aligned to secure the first part at the corresponding first securement hole on the electrical box; or an outer hole of the second plurality of holes is aligned to secure the second part at the corresponding first securement hole on the electrical box.

12. The securement device of claim 11, wherein, the inner hole of the first plurality of holes or the inner hole of the second plurality of holes is an innermost hole and the outer hole of the first plurality holes or the outer hole of the second plurality holes is an outermost hole.

13. A support arrangement for electrical devices, the support arrangement comprising:

an electrical box; and a securement device that includes an elongated body, the elongated body including:

a center hole located in a middle portion of the elongated body, between a first side of the elongated body that is configured to support a first wireway relative to the electrical box and a second side of the elongated body that is configured to support a second wireway relative to the electrical box, the center hole being arranged to secure the elongated body at a knockout of the electrical box; and a break feature extending on the middle portion of the elongated body and intersecting the center hole, to allow the elongated body to be broken along the break feature for separate installation onto the electrical box of a first part of the elongated body and a second part of the elongated body.

14. The support arrangement of claim 13, wherein the break feature is at least one of a score line, an area of weakened material, an area of removed material, or an area of thinner material.

15. The support arrangement of claim 13 further comprising:

a first hole located on the first side of the elongated body; and a second hole located on the second side of the elongated body, on an opposite side of the center hole from the first hole;

wherein, in a first installed configuration, with the elongated body unbroken along the break feature, the elongated body is secured at a central knockout hole of the electrical box via the center hole; and wherein, in a second installed configuration, with the elongated body broken along the break feature, at least one of the first part or the second part is installed on the electrical box at the central knockout hole via at least one of the first hole or the second hole, respectively.

16. The support arrangement of claim 15, further comprising:

a first plurality of holes located on the first side of the elongated body, to an opposite side of the first hole from the center hole, including a first inner hole and a first outer hole; and a second plurality of holes located on the second side of the elongated body, to an opposite side of the second hole from the center hole, including a second inner hole and a second outer hole;

wherein, in the first installed configuration, the elongated body is further secured at a first securement hole on the electrical box via one of the first inner hole or the second inner hole; and wherein, in the second installed configuration, one of the first or second parts is further secured to the electrical box at the first securement hole via, respectively, the first or second outer hole.

17. A method of installing one or more electrical wireways on an electrical box, the method comprising:

providing a securement device that includes:

an elongated body;

a center hole located in a middle portion of the elongated body;

a break feature extending on the middle portion of the elongated body;

first-side holes located on a first side of the center hole, including a first hole and a first plurality of holes opposite the first hole from the center hole; and second-side holes located on a second side of the center hole, opposite the first side, including a second hole and a second plurality of holes opposite the second hole from the center hole;

selectively installing the securement device on the electrical box in either of a first installed configuration or a second installed configuration, by:

for the first installed configuration, with the securement device unbroken along the break feature, securing the securement device to a central knockout hole of the electrical box via the center hole; and for the second installed configuration, by:

breaking the securement device along the break feature into a first part and a second part; and, securing at least one of the first part or the second part to the central knockout hole of the electrical box via, respectively, at least one of the first hole or the second hole; and supporting the one or more electrical wireways relative the electrical box in the selected first or second installed configuration via:

the elongated body, in the first installed configuration; and the at least one of the first part or the second part, in the second installed configuration.

18. The method of claim 17, wherein:

the first plurality of holes includes a first inner hole and a first outer hole;

the second plurality of holes includes a second inner hole and a second outer hole;

wherein, in the first installed configuration, the method further comprises securing the elongated body at a first securement hole on the electrical box via one of the first inner hole or the second inner hole; and wherein, in the second installed configuration, the method further comprises securing one of the first or second parts to the electrical box at the first securement hole via, respectively, the first or second outer hole.

19. The method of claim 18, wherein, the first or second inner hole is an innermost hole and the first or second outer hole is an outermost hole.

20. The method of claim 17, wherein installing the securement device on the electrical box in the second installed configuration further includes:

providing a second securement device that includes a second elongated body and a second center hole located in a middle portion of the second elongated body; and securing the second securement device to the central knockout hole of the electrical box via the second center hole.

* * * * *